United States Patent Office 3,216,886
Patented Nov. 9, 1965

3,216,886
PROCESS FOR THE PREPARATION OF BAGASSE FIBERS
Raphael Katzen, 3735 Dogwood Lane, Cincinnati, Ohio
No Drawing. Continuation of application Ser. No. 109,836, May 15, 1961. This application Feb. 4, 1964, Ser. No. 342,516
8 Claims. (Cl. 162—28)

This application is a continuation of application Serial No. 109,836, filed May 15, 1961, now abandoned.

This invention relates to a process for preparing bagasse and similar fibers by separating them from the pith and/or dirt which adheres to them in the raw or natural form.

Bagasse is crushed, juiceless sugar cane as it comes from the mill after the juice has been extracted. It is produced in immense quantities, particularly in the subtropical areas, and is used in the production of various types of pulp, fiberboard, mats, preforms, and similar products.

Raw bagasse from which the juice has been extracted is a fibrous pulpy mass principally made up of cellulosic fibers, pith, residual sugars and water, together with dirt and extraneous matter. Of this raw material the fibers have major utility, but must be separated from the pith for manufacture into end products. As a general rule, the prepared fibers should be as long and as strong as possible to impart maximum strength to the various end products into which they are made.

As it comes from the mill, the moisture content of raw bagasse is roughly about 50% on an "as is" basis (weight moisture/weight undried bagasse), that is, 1 part water in 2 parts undried bagasse. It is conventional to permit residual sugar in the bagasse to ferment and thereby be converted or destroyed, since it is undesirable in the final fibrous product. This is effected by baling and storing the bagasse, during which fermentation occurs naturally. The heat generated incidental to the fermentation process, together with natural air circulation, reduces the moisture content of the raw bagasse to about 15 to 30%.

The preparation of refined bagasse fibers from raw bagasse depends largely on empirically determined principles. The basic problem is to separate the fibers from the pith which is intimately associated with them, while retaining, as nearly as practicable, the strength of the raw fibers. It is desirable to minimize fiber cutting and breakage insofar as is consistent with the working which is necessary to remove pith from the fibers, since fiber length bears an important relation to the quality of the product. The cost of the process—labor, power and capital expense—is a critical factor in any bagasse processing operation because of the low value of the raw material and end products. It is generally impossible to predict with any accuracy what the quality of the product of any given bagasse process will be, and the techniques which have been evolved are based more upon comparative actual resuts than upon theoretical analysis.

Broadly speaking, there have heretofore been two general methods of preparing bagasse fibers from raw bagasse, which may be refered to as the dry method and the wet method. In the dry method, raw bagasse after fermenting is dried in air or by forced drying until its moisture content is about 5 to 15%. The dried material is then ground in a mill to loosen and remove pith from the fibers. This method is relatively economical since the highly dried bagasse can be ground with very low power consumption, but the fibers so prepared are relatively short and include a high proportion of fines and, moreover, are of low strength, apparently because they are severely weakened by the drying operation and tend to crumble or break during the grinding operation. As a result of the low strength of the fibers, the pith is imperfectly removed from them by the grinding operation. It is believed that bagasse fibers are permanently damaged if they are dried to an excessively low moisture content, apparently less than about 15%, and low fiber strength invariably results if this occurs prior to the separation of the pith. Products made from such fibers are deficient in strength and in moisture and chemical resistance.

In the wet process, fermented bagasse is dispersed in the form of a liquid slurry, of which the liquid content may be 70 to 85%, and is then ground in such suspension. This technique effects good separation of the fibers from the pith because the fibers are not embrittled, but at the same time consumes large amounts of power. Moreover, after grinding, the fibers and pith are both in liquid suspension, and must be separated and dried, further imparing process economics. Large amounts of fiber are unrecoverably lost with the pith, and the cost of the energy required to dry the recovered fibers is high. Thus, whereas the dry process offers good economics but a relatively poor product, the wet process provides a good product but at high cost.

In accordance with the present process fibers of good average length and strength are produced at relatively low cost, thereby overcoming the disadvantages inherent both in slurry processing and in premature fiber drying.

I have empirically discovered and determined that high quality bagasse fibers may be prepared by moistening fermented raw bagasse, preferably at moderately elevated temperatures, until the fibers have a moisture content of about 20 to 60% by weight, on an "as is" basis, whereby the fibers and pith are softened and swelled, but by which they are not so wetted as to be in slurry or suspended form. The fibers thus moistened are then subjected to a two-step milling operation in an attrition mill of the single or double rotating disc type. In the first milling step, the discs or plates of the mill are spaced relatively widely, at about 0.10 to about .200 inch clearance. In this step large fiber bundles are broken up and a large proportion of the adherent pith and dirt is loosened or separated from the fibers. This separated pith and dirt are then preferably removed. In the second milling step, the fibers are milled in an attrition mill having discs which are more finely set, at a separation of about .001 to about .020 inch. In this step remaining adherent pith is nearly completely separated from the fibers. Surprisingly, average fiber length and strength are not unduly reduced by this two-part milling operation, even by the very closely set discs of the second milling step, but a very large proportion of the pith and dirt is removed from the fibers. These highly desirable results are made possible by the previously described moistening of the fibers prior to the milling operation. After separating the fibers from the free pith and drying it to remove the remaining added moisture, the fibers are ready for manufacture into fiber board or mats of high strength and moisture resistance.

In this process the severe and adverse fiber embrittlement occurring in the previously described dry method is completely avoided, and fiber strength is much better than in the product of that method. On the other hand, the present process does not involve slurry handling and is of much more favorable economics than the wet process.

More specifically, in accordance with a preferred embodiment of this invention, raw bagasse which preferably has been baled and stored to permit natural fermentation processes to destroy residual sugar, is conditioned by breaking up the compressed bale into large chunks and treating it with water until its moisture content is in the range of 20 to 60% by weight, and is preferably in the range of 30 to 50%. The bagasse is thereby moistened sponge-like but is not saturated or made so wet that it forms a slurry. Pith can be more rapidly and economically removed from the moistened fibers if the bagasse is heated during moistening to about 120 to 210° F. and preferably to about 140 to 180° F. This may be effected, for example, by heating the water prior to spraying or otherwise adding it to the raw bagasse, or by heating the bagasse with steam. By raising the temperature of the bagasse I have found that the raw material is softened and swelled with somewhat smaller amounts of water, whereby a higher throughput to the milling steps is effected and whereby milling power consumption is reduced.

The moistened bagasse is fed at a steady rate to an attrition mill equipped with discs having patterns selected to give a maximum rubbing action and a minimum cutting action. Plates of the so-called waveline type, for example, are suitable for this purpose. The initial rough separation of the pith and fibers is made by setting the mill discs at a spacing of about .010 to about .200 inch, and preferably of about .020 to .060 inch.

After the first milling operation, the loosened pith and dirt are separated by conventional means, for example on a shaker screen or by air and gravity classifying means. I prefer to separate initially loosened pith prior to the second milling step, but this separation may alternatively be effected after that step if desired.

In the second milling step, the cleaned "first pass" fibers are further refined in an attrition mill in which the discs are more closely set, at a clearance of almost nil to about .020 inch, and preferably of about .001 to .005 inch. (At zero disc setting there is usually in fact a slight clearance between the discs, and they are not actually in contact.) In this step most of the remaining attached pith is loosened and separated from the fibers. While fiber length is inevitably reduced somewhat during this step, I have found that it is minimized if the fibers have been moistened to the previously specified moisture content.

At this point only a small amount of pith remains attached to the fibers, but a large amount of free pith and dirt is mixed with them. The fiber is separated from this free pith and dirt by screening or air separation and is then dried by conventional means, preferably by being passed through a heated drier in a stream of air. The drying operation loosens the remainder adherent pith, which is preferably separated from the dried fiber in a final screening or air separation. It is also contemplated that the "second pass" fiber and admixed pith may be dried without intermediate separation, all of the pith being separated from the fiber by the final separation after drying.

In accordance with this process, by grinding first at a relatively large disc separation and then at a fine separation, as specified, I have found that the fiber bundles are substantially completely opened and pith is substantially completely separated from the fiber with little or minimal degradation of desirable fiber by drying or by cutting or grinding action in the mill. Yield of fiber is high, with low loss incidental to pith separation. The product so prepared shows discrete fiber bundles substantially free of pith and having lengths up to one and even two inches or more. These fibers are quite flexible and show physical properties which are equal to or better than those of wet process fiber. Energy consumption of the process per unit weight of fiber produced is little if any greater than that of the dry process.

Following are two specific examples illustrating the practice of the present process:

Example 1

Bales of fermented raw bagasse with a moisture content of 18% are broken up into chunks which are sprayed with cold water until the total moisture content of the bagasse is 50% as is (one pound of moisture per pound of dry bagasse). The moistened bagasse is held in an enclosed space at ambient temperature, e.g. 75 to 80° F., for several hours until its moisture content is substantially uniform.

The conditioned bagasse is then milled in a single disc attrition mill having a disc spacing of .050 inch. An example of one type of attrition mill which is suitable for effecting this step is a Bauer attrition mill equipped with waveline type discs. The crude fiber is passed over shaker screens having perforations of ⅛ inch diameter, the dirt and pith passing through the perforations as the fiber slides along the inclined deck.

The fiber is then fed at a steady rate to a second attrition mill having plates set at a clearance of .005 inch. This mill may also, but need not necessarily, be a Bauer mill equipped with waveline plates. The refined fiber coming from the second milling step is passed over a shaker screen with ⅛" perforations. The fiber is then dried to a moisture content of 5% or less. This dry fiber is then passed through an air separator in which light pith and fines are blown overhead by a controlled air stream, heavier pith and dirt drop through the shaker pan or deck, while the clean bagasse fiber moves along the pan and is collected through a take-off chute for subsequent processing as desired. Additional short fibers may be recovered from the separated pith and dirt by subjecting the fines to a further screening operation using a shaker screen having 1/16 inch diameter perforations, or by an air separation in which the air velocities are lower than in the earlier operation.

Example 2

Bagasse from bales which have completed their natural fermentation and which have an average moisture content of 15% is conditioned by treating with hot water and steam until it attains an average moisture content of 30% and a temperature of about 160° F. The moistened and heated fiber is maintained in an enclosure for a period of about 30 minutes to permit equalization of moisture and temperature.

The fiber is sent to an attrition mill for coarse milling between plates spaced at .030 inch. The crude fiber is separated from pith and dirt in an air separator equipped with a perforated pan. The cleaned fiber is subjected to a second milling in an attrition mill having discs set at .003 inch clearance.

The refined fiber is dried to a moisture content of 5% or less in a hot air drier in which the fiber is suspended in an air stream. Loosened pith and residual dirt are separated from the dried fiber in an air separator fitted with a perforated pan.

The process of this invention may be carried out in conventional commercial equipment adapted to provide the indicated type of conditioning, grinding, separating, and drying functions, or their equivalent. It is contemplated that special equipment may be used for effecting two or more steps of the process simultaneously or continuously. While the process has been described herein in relation to the preparation of bagasse fibers, it should be understood that the invention is not limited to the preparation of such fibers alone but is also adapted for the preparation of fibers from other raw materials of vegetable origin wherein the fibers are separated from adherent non-fibrous pith, including straw, corn stalks, plants of the agave family, wood, and the like.

What is claimed is:

1. A process for separating the fiber content of a fiber-containing vegetable material from non-fibrous pithy material adherent thereto in said vegetable material and for simultaneously converting said fiber content into discrete fiber bundles without pulping the same by delignification and hydration, said process consisting essentially of the steps of moistening said vegetable material with water to a moisture content of about 20 to 60% by weight, no pulping chemicals being added, said pithy material and fiber content thereby being swelled and softened, milling the moistened vegetable material in a mill of the rotating disk attrition type having disks which are spaced about .010 to about .200 inch, thereby at least partially converting the fiber content of said vegetable material to discrete fiber bundles having at least a portion of the pithy material loosened therefrom, thereafter milling the once-milled fiber content more finely in a mill of the rotating disk attrition type having disks which are spaced about .001 to about .020 inch, the moisture content of the material during the second-described milling being within said range of 20–60% by weight, said second milling loosening and separating substantially all the pithy material still adhering to said fiber content and further converting the fiber content into fiber bundles, and separating the pithy material from said fiber bundles.

2. A process in accordance with claim 1 wherein said process includes the intermediate step, prior to said second-described milling, of separating the pithy material loosened by said first-described milling.

3. A process in accordance with claim 2 which includes the additional step of recovering fine fibers from the pithy material separated by said intermediate step, and from the pithy material separated after the first milling step.

4. A process in accordance with claim 1 wherein said vegetable material is at a temperature of about 120 to about 210° F. during both said milling steps.

5. A process in accordance with claim 1 wherein said moisture content is in the range of about 30 to 50%.

6. A process for separating the fiber content of bagasse from pith adherent thereto in said bagasse and for simultaneously converting said fiber content into discrete fiber bundles without pulping the same, said process consisting essentially of the steps of moistening bagasse with water to a moisture content of about 20 to 60% by weight, no pulping chemicals being added, said pith and fiber content thereby being swelled and softened, milling the moistened bagasse in a mill of the rotating disk attrition type having disks which are spaced by about .010 to about .200 inch, thereby at least partially breaking up large fiber bundles and loosening therefrom at least a portion of the pith, thereafter milling the once-milled fiber content more finely in a mill of the rotating disk attrition type having disks which are spaced about .001 to about .020 inch, the moisture content of the material during the second-described milling being within said range of 20–60% by weight, said second milling loosening and separating substantially all the pith still adhering to said fiber content and further breaking up the fiber content into fiber bundles, and separating the pith from said fiber bundles.

7. A process in accordance with claim 6 which includes the preliminary step of naturally fermenting said bagasse during storage, in the absence of added enzymatic or pulping agents, to destroy residual sugars therein.

8. The process of claim 6 which includes the intermediate step, prior to said second-described milling, of separating the pith loosened by the first-described milling, and the step of recovering from the separated pithy material fibers therein.

References Cited by the Examiner
UNITED STATES PATENTS

| | | | |
|---|---|---|---|
| 1,155,741 | 10/15 | Lee | 162—96 |
| 1,854,557 | 4/32 | Munroe | 162—96 |
| 2,729,856 | 1/56 | Horton | 241—28 |
| 2,899,350 | 8/59 | Birdseye | 162—96 |
| 2,913,362 | 11/59 | Cusi | 162—96 |

DONALL H. SYLVESTER, *Primary Examiner.*